United States Patent
Loftus

(10) Patent No.: US 12,006,026 B2
(45) Date of Patent: Jun. 11, 2024

(54) SOUND-REDUCING ROTOR BLADE TRACKING WEDGE PROFILE

(71) Applicant: Robert T. Loftus, Phoenix, AZ (US)

(72) Inventor: Robert T. Loftus, Phoenix, AZ (US)

(73) Assignee: HAYMATT, L.L.C., Phoenix, AZ (US)

( * ) Notice: Subject to any disclaimer, the term of this patent is extended or adjusted under 35 U.S.C. 154(b) by 0 days.

(21) Appl. No.: 17/369,238

(22) Filed: Jul. 7, 2021

(65) Prior Publication Data

US 2022/0009623 A1    Jan. 13, 2022

Related U.S. Application Data

(60) Provisional application No. 63/050,655, filed on Jul. 10, 2020.

(51) Int. Cl.
*B64C 27/00* (2006.01)
*B64C 27/467* (2006.01)

(52) U.S. Cl.
CPC .......... *B64C 27/008* (2013.01); *B64C 27/467* (2013.01)

(58) Field of Classification Search
CPC .... B64C 27/008; B64C 27/467; B64C 27/028
See application file for complete search history.

(56) References Cited

U.S. PATENT DOCUMENTS

| | | | |
|---|---|---|---|
| 3,952,601 A | 4/1976 | Galli et al. | |
| 3,999,888 A | 12/1976 | Zincone | |
| 4,601,639 A | 7/1986 | Yen et al. | |
| 4,618,313 A * | 10/1986 | Mosiewicz | F04D 29/384 416/62 |
| 5,088,665 A * | 2/1992 | Vijgen | F03D 1/0675 244/215 |
| 5,492,448 A * | 2/1996 | Perry | B64C 3/14 416/243 |
| 7,118,343 B2 | 10/2006 | Loftus et al. | |
| 8,192,162 B2 | 6/2012 | Loftus et al. | |
| 2010/0028151 A1* | 2/2010 | Loftus | B64C 27/008 416/144 |
| 2015/0292522 A1* | 10/2015 | Singh | F03D 7/0296 416/228 |
| 2016/0052627 A1 | 2/2016 | Piechowicz | |

OTHER PUBLICATIONS

Vasishta Bhargava et al., "A Review of Trailing Edge Bluntness and Tip Noise from Wind Turbine Blades", IOSR Journal of Applied Physics, e-ISSN: 2278-4861, vol. 9, Issue 4 Ver. IV (Jul.-Aug. 2017), pp. 20-31.

(Continued)

*Primary Examiner* — Nicholas McFall
*Assistant Examiner* — Terri L Filosi
(74) *Attorney, Agent, or Firm* — Bycer & Marion, PLC; Matthew L. Bycer

(57) ABSTRACT

This invention provides convenient airframe vibration, tracking, and acoustic improvements of a helicopter rotor blade by use of a profile system. The profile system is designed to minimize acoustic disturbances as air passes the airfoil. The profile may be attached through an adhesive system that allows convenient removal and relocation for use by the helicopter manufacturer or by the helicopter operator in a field environment.

6 Claims, 8 Drawing Sheets

(56) References Cited

OTHER PUBLICATIONS

Valentin Butoescu, "A Vortex Model of a Helicopter Rotor", INCAS—Bulletin No. Jan. 2009, Dept of Aerodynamics, "Elie Carafoli" National Institute for Aerospace Research—INCAS 061126, Bucharest, Romania, pp. 23-27.
Edvard Schroeder et al., "Aerofoil Trailing Edge Self-Noise Reduction by Surface Mounted Attenuation Devices", Proceedings of the 23rd International Congress on Acoustics, Aachen, Germany, Sep. 9-13, 2019, pp. 5327-5334.
J. Nedic and J.C. Vassilicos, "Vortex Shedding and Aerodynamic Performance of an Airfoil with Multi-scale Trailing Edge Modifications", American Institute of Aeronautics and Astronautics, Imperial College London, pp. 1-24.
Nikitas Thomareis and George Papadakis, "Effect of Trailing Edge Shape on the Separated Flow Characteristics Around an Airfoil at low Reynolds Number: A Numerical Study", Physics of Fluids 29, (published online Jan. 17, 2017 by the American Institute of Physics), pp. 014101-1 to 014101-17.
Z. Zuo et al., "An Analysis on the Flow Field Structures and the Aerodynamic Noise of Airfoils with Serrated Trailing Edges Based on Embedded Large Eddy Flow Simulations", Journal of Applied Fluid Mechanics (JAFM), vol. 12, No. 2. pp. 327-339 (2019).
Michael J. Collison et al., "Vortex Shedding Noise Reduction of a Mixed Flow Fan: Experimental and Numerical Investigation", Fan 2015 Conference Paper (France), Apr. 15-17, 2015), pp. 1-11.
E.L. Houghton et al., "Camber Line—an overview", ScienceDirect Topics (Jun. 4, 2021), pp. 1-21.

\* cited by examiner

Blade Airfoil Cross Section

Standard Wedge Installation

SOUND-REDUCING ROTOR BLADE TRACKING WEDGE PROFILE

CLAIM OF PRIORITY

The present application includes subject matter disclosed in and claims priority to a provisional application entitled "Sound-Reducing Rotor Blade Wedge Design" filed Jul. 10, 2020 and assigned Ser. No. 63/050,655, describing an invention made by the present inventor.

BACKGROUND OF THE INVENTION

1. Field of the Invention

The present invention relates to helicopter rotor vibration reduction tracking wedges; in particular to the ramp profiles upon the trailing edge of rotor blades for the purpose of controlling acoustic effects.

2. Description of Related Prior Art

To control dynamic vibrations of rotor blades, weights and trim tabs have been used and attached on the blades. Ramp tabs have also been known in the art for improving the dynamic vibration control on helicopter rotor blades. The inability to make field changes has made permanently bonded ramp tabs impractical as a primary method for periodic blade tracking and vibration reduction. Field installable tracking wedges represent a practical solution to issues of tracking and vibration issues. However, such tracking wedges can often result in an unwanted acoustic profile as the blades rotate.

Field installable (and removable) rotor blade vibration wedges represent the state-of-the-art in flexible dynamic vibration taming. For instance, U.S. Pat. No. 8,192,162 teaches numerous elastomer profiles useful for adapting rotor blade shapes to minimize or defeat vibration effects. Numerous wedge shapes have been proposed as field-installable adhered elastomer profiles onto the top surface (towards trailing end) of the rotor blade. When focused on the action of a single rotary blade, the influence of trailing edge design, on the noise generated by movement, has been attributed to both turbulent boundary layer trailing noise (generated by the turbulent boundary layer passing over the trailing edge), and blunt trailing edge noise (generated from von Karman vortex shedding over the blunt trailing edge). Geometric shapes described and commonly used in the prior art have been linear modifications to the top-side wedge. However, geometrically linear wedges suffer a slight drawback in that their shape, particularly the trailing end, can cause turbulent vortices behind the rotating blade, resulting in undesirable noise, such as chirping, popping, or ringing, that can be distracting to pilots and others within the vicinity of the operating helicopter rotor blades.

Noise is common in the helicopter art, but an increase in acoustical noise has been observed with the use of certain planar or blunt profile geometries on the aerodynamic behavior in the vicinity of the trailing end of operational helicopter rotor blade airfoils. The source of this noise has been attributed to the properties of the turbulent boundary layer convecting over the trailing end due to abrupt termination at the rear ends of the installed profile. Larger turbulent air structures convecting into the wake can lead to relatively complex unstable vortex structure.

For the purpose of airfoil noise analysis, aerodynamic noise produced near trailing ends of airfoils is strongly dependent on the flow, vortex shedding, lift-to-drag ratio, and laminar separation, transition, and reattachment of the shear layer. The shedding from the separated shear layer has been attributed to Kelvin-Helmholtz instability that can cause characteristic acoustic frequencies. Vortex frequency peak is consistent with the fluctuations of the lift-and-drag coefficients, and the shedding of the trailing edge vortex. This frequency is also close to the results of trailing end vortex shedding by tonal noise frequency.

Another major source of aerodynamic noise results from vortices near the trailing end. Work has been attempted to reduce pressure fluctuations near that region (above and below, as well as behind the trailing end). Further improvements to noise-reduction profile shapes in tracking wedges have been proposed specifically for acoustic management. Span-wise angular serrations have been implemented on the tab upper surface to reduce the amount of turbulence created by airflow as the air moves radially across the blade. Varied peak and valley designs have been be implemented on the wedges, or otherwise cut into the rotor upper surface. Attenuation of tonal noise were associated with the influence of the serrations on the T-S (Tollmien-Schlichting) wave and the separation bubble. Serrations can weaken the instability of the T-S wave, and prevent amplifications of the instability due to the separated boundary layer. Current serration trailing edge treatments aim to improve mixing. The serration decreases noise by reducing the associated velocity non-uniformities of the wake. With high Reynolds numbers, breaking down the von Kármán vortex sheets produced by the blunt trailing edge suppresses the von Kármán vortex sheets resulting in a reduction in the vortex shedding noise. However, stagnant pockets, and shock pressure waves, at the trailing (and/or suction) end collapse or implode causing perceptible discreet audible events.

Tonal noise frequency observed corroborates this finding. The frequency is consistent with the vortex shedding frequency at the pressure side of trailing end. Flow around an airfoil causes trailing-end noise to be produced by the flow over the airfoil. Flow separation and oscillating vortex formation and shedding noise has been found to be a secondary and unwanted issue with the use of airfoil tracking wedges having a triangular shape in cross-section.

A modification of tracking wedge termination profiles has been found to reduce the increased noise associated with the installation of profiles on a rotating helicopter blade. Further improvements to noise-reduction profiles in tracking wedges have been proposed for acoustic management. While angular serrations on the wedge upper surface reduce the amount of turbulence created by airflow as the air moves radially across the tracking wedges, these solutions lack the appropriate geometries necessary to provide acceptable improvement in acoustic noise production and reduce the effectiveness for correcting dynamic vibration. Varied peak and valley designs, or otherwise cuts into the rotor upper surface, may minimize noise, however, these more cumbersome approaches lack the versatility and effectiveness of field-installable wedges.

Therefore, it is a primary object of the present invention to provide an acoustically preferred wedge profile for a rotor blade.

It is another object of the present invention to provide a helicopter rotor blade accessory for management of vibration and/or acoustic properties.

These and other objects of the present invention will become apparent to those skilled in the art as the description thereof proceeds.

SUMMARY OF THE INVENTION

The present invention is directed to a method of reducing vibration created by a helicopter main rotor blades or tail rotor blades, or airfoils generally, by use of an attachable and detachable profile system. The profile is specifically shaped to minimize acoustic profile during rotation of the blades. Preferably, an adhesive system allows convenient installation and removal onto top or bottom surface of the rotor blade and/or tab, and/or may be adhered to the trailing end of the blade and/or tab. The shape profile may extend beyond the rotor chord length in trailing direction to minimize turbulence flow without negatively impacting blade performance. The profile may also be adhered only to the trailing end of the airfoil. The wedge profile may be adhered to the top and/or bottom surface of the rotor blade and/or tab, and/or may be adhered to the trailing end of the blade and/or tab.

The tracking wedge may include a body configured for attachment to an aerodynamic surface, a leading edge, a trailing edge, along top side, underside and/or trailing edge, with acoustic management shape. The acoustic management shape may be disposed proximate to the trailing edge of the tracking wedge. The first acoustic management shape may have a curvi-linear trailing edge configured to modify turbulent vortex in the shear layer as air moves over a surface of the tracking wedge and trails there behind. The tracking wedge may extend over a top and/or bottom side of the airfoil/blade and the trailing surface of the rotor blade and/or trailing tab.

Trailing edge of the profile may include an acute return angle, and/or may include a curved rear edge. Off the trailing end, the profile thereto adhered may form an acute angle directed linearly or via a curved path to the rear top point/line of the profile. The profile may include a curvature that mates with the tab top and/or bottom surface, or may extend and adhere to the trailing end of the tab/blade. The wedge profile may adhere to less-than-full part of the height of the trailing end or completely cover the height of the trailing end of the tab/blade.

According to yet another embodiment disclosed herein, a method of managing an acoustic profile associated with a tracking wedge is described. The method may include routing downstream velocity and vortex shedding of the tracking wedge, and modifying flow characteristics in the separating shear layer, to reduce noise using an acoustic management mechanism.

A profile may extend rearward of rotor tailing end to encompass, or occupy, a predetermined vortex structure zone(s) in the flow field. The present invention includes a method of determining vortex turbulence created by movement of rotor with wedge attached, and designing or emplacing, a trailing edge of the profile to encompass the space or otherwise modify geometry of the trailing edge of an airfoil via application of a wedge profile.

BRIEF DESCRIPTION OF THE DRAWINGS

The present invention will be described with greater specificity and clarity with reference to the following drawings, in which.

DETAILED DESCRIPTION OF THE PREFERRED EMBODIMENTS

Figure 1A:
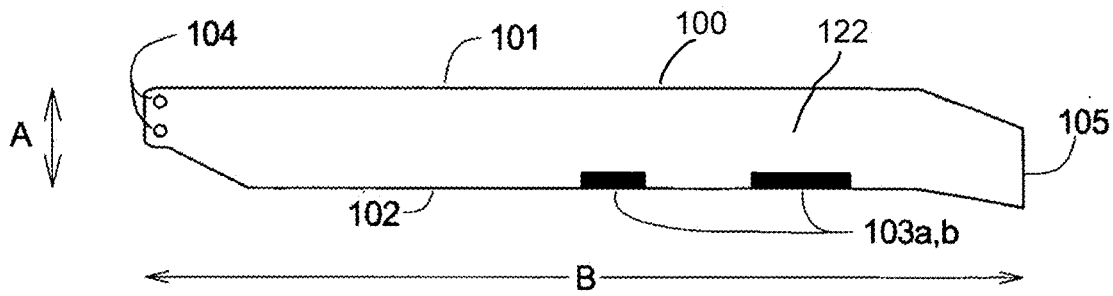
FIG. 1A illustrates a top view of a rotor blade including two separate attached wedges along the trailing end of the prior art.

Wedge design concepts are sized and shaped to mitigate noise. Air-frame vibration profiles cause minimal acoustic side-effects while managing rotor-induced vibration, and optionally improving blade tracking. The improvements are provided by utilizing installable profiles, a.k.a. wedges. The profiles are also useful in test rigs or shop measurements to provide initial rotor adjustment. Field adjustments over the service life of a helicopter rotor blade are enabled without the need for the rotor blades to be removed from the helicopter. Field adjustments may be conveniently done with greater precision and repeatability utilizing precisely known geometric additions to a rotor that do not unduly raise acoustic decibel levels. Profiles of specific geometry are affixed to the trailing end of the rotor blade for the purpose of providing a small aerodynamic change to the blade.

A rotor blade may be fitted with a wedge on various locations of the rotor blade towards trailing edge. The wedge may be used to alter the aerodynamic properties of the rotor blade to correct for improper tracking conditions. The wedge may be configured for attachment to an aerodynamic surface, such as the rotor blade airfoil.

U.S. Pat. No. 8,192,162 (issued Jun. 5, 2012 to Loftus, et al., herein incorporated by reference) discusses the selection of an elastomer as an optional material for this device. Loftus, et al. taught that the cross-section of the profile is small in area, the device should strain at the same magnitude as the rotor blade surface to which is attached. When applied by an adhesive, it has been shown that shear strain in the adhesive is directly proportional to the material stiffness of the profile device. Pressure sensitive adhesive (PSA) systems were therefore preferred for ease of installation and removal by aircraft mechanics in a field environment.

When attached to the top or bottom surface near the trailing end of the airfoil, the profile modifies the overall airfoil geometry, and may, in some examples, change the manner in which air flow moves over the blade-profile combination, creating a less audible noise than a similarly configured tracking wedge without the acoustic management shape. In other examples, a tracking wedge may include an acoustic management shape profile on the trailing end of the blade.

Profile shape has an effect on the aerodynamics of a given rotating rotor blade that may be dependent on the width, the angle, and the length of the profile in addition to its span-wise placement on the rotor blade. It is also known that the profile geometry and shape can impact flow pattern on the trailing end, and that certain curvilinear, and other, shapes are preferable to reduce vortices (number and/or size) in the shed shear layer. Acoustic management is possible by tailoring the acoustic effect of the profile with varying shapes. Thus, modifying the trailing edge of the profile to modify the airflow trailing end can reduce the amplitude of turbulent flow frequencies.

When a profile is exposed to airflow moving over the mated airfoil, the aerodynamic properties of the profile may create some unintended or undesirable effects. Often, air moving over and past the profile may generate noise that necessitates correction. Shear layers in the shed wake moving past the blade may cause vortices behind trailing end of airfoil. To correct for unwanted noise generation, the profile may include various acoustic management shapes disposed proximate to the trailing edge of the profile and impinge the resonance zone otherwise caused during use, and emplace a profile with shape extending beyond trailing end of airfoil to minimize resonance zone. By inhabiting space of expected shedding, the profile can minimize vortices and pressure differentials at or beyond the airfoil trailing end. Acoustic management shapes may include variable trailing edge configurations to modify a movement of air moving over a surface of the tracking wedge. A profile may be adhered to the top or bottom of the airfoil, and additionally along the trailing end of the airfoil. In other embodiments, a profile may adhere to the top, bottom, and trailing end of the airfoil, and in other embodiments, the profile may simply adhere to the trailing end of the airfoil.

As seen in the Figures, the wedge shape, may be configured to modify the manner in which air flows over the tracking wedge profile 3 from a leading side 21 to the trailing edge 2 of tracking wedge profile 3. The size and spacing of the acoustic management mechanism may vary depending on the particular application. In some examples, a balance between the number, size, and effect of the acoustic management mechanism and the amount of adjustment necessary to correct for improper tracking may be desirable.

In some examples, the profile may be shaped to provide for a desirable upforce or downforce to adjust for improper tracking, or other methods used to modify a movement of trailing end airflow in a manner that provides a suitable path to reduce noise for air leaving the profile. The more suitable path, in some examples, may reduce the amount of disturbance placed on the air moving over, and leaving, the surface of the profile, which in some examples may reduce the noise generated by the airfoil with profile attached.

When applied to a rotating blade, the profile alters the response of the rotor blade by adding camber to the airfoil near the trailing edge. Camber changes the aerodynamic pitching moment of the airfoil, and the further aft the camber, the more effective it is at doing so. Smoothly decreasing the thickness of the airfoil-wedge assembly to a minimum at the trailing edge thickness at its terminus is the key to reducing the noise produced. But doing so within the limit of the original airfoil trailing end necessarily adds camber that opposes the desired camber from the wedge and does so at the most effective location. The result is a wedge that is quiet but changes the blade's dynamic response in an undesirable condition. By increasing the aft most extent of the wedge to beyond the trailing end of the airfoil it is possible to both smoothly decrease the thickness of the airfoil-wedge assembly and maintain or even increase the desired aft camber. This yields a wedge that is both effective at altering the dynamic response of the blade and reduces noise. Any wedge profile that extends beyond the airfoil's trailing edge, smoothly reduces the total thickness of the assembly as the trailing edge of the assembly is approached, and which preserves or increases the camber of the assembly in the desired direction between the trailing edge of the original airfoil and the trailing edge of wedge-airfoil assembly is covered by this invention.

Each of the profiles has suitable adhesion to ensure that it remains in place during service of the airfoil to withstand shear forces due to centrifugal force of rotation and peel forces from aerodynamic impingement during flight. The blade chord dimension extending between the leading edge 1 and trailing end 16 of the airfoil 100 may be extended by a profile 3. The span dimension may be measured in the direction from the center of a rotor radially outward to the tip of the rotor. In a preferred embodiment, a profile may be installed on the trailing end of a helicopter rotor blade (with respect to the motion of the blade through the air). The profile can be installed on either the upper or lower side of the rotor blade trailing end, and may also extend rearward past the trailing end.

The effect that a short segment of profile has on the aerodynamics of a rotating rotor blade may be similar to the effects of a bending adjustment made to a conventional metal trim tab. Both devices cause a local change to the aerodynamic pitching moment at the location of change. Although small, these changes can correct differences within a rotating set of blades resulting in lower vibration and a better rotor track condition. The benefit of providing adjustment at a variety of span-wise locations along rotor blade is that rotor vibration and tracking can be optimized throughout a range of forward speed of the helicopter. As the helicopter flies faster, the span-wise regions of the blades that provide the greatest contribution to lift will vary whether the blade is advancing in the direction of flight or retreating. As a result, adjustments can be made at varying span-wise location(s) along the blade in order to reduce vibration and improve tracking throughout the range of airspeeds that the helicopter can fly. The adhered profile may be applied at any span-wise location with any desired angle or span-wise length. A greater degree of adjustment to vibration and track through a wider range of airspeed can be made without the necessity to modify the basic design or construction of the rotor blade itself. As the speed with which the profile moves relative to the vehicle depends on the span-wise location, a different profile geometry may be preferred to minimize acoustic disturbances at each span-wise placement. In some embodiments, the profile may include a variety of cross-sectional shapes that change in the span-wise direction. For instance, a sharp angle may be preferred towards the tip of the airfoil, and a wider angle may be preferred on the rotor-facing portion of the profile.

The profile may be aligned on the trailing end of a helicopter rotor blade as already illustrated in FIG. 1. In prior art installations, the trailing edge side 30 of the profile 3 and the trailing end 16 of the helicopter rotor are substantially aligned.

Utilizing this invention, a rotor blade may be initially statically mass balanced to within acceptable tolerances or receive an initial satisfactory balance on a ground-based test stand. Airframe vibration and rotor track measurements are then measured in an actual flight situation. The vibration measurement is preferably done by an in-flight measuring system by use of accelerometers or with vibration sensors, as is known in the art. The amount of, shape of, and the location of, the corrective profile(s) is then added (or removed) and new magnitude of airframe vibration is again determined during flight. If unacceptable vibrations, tracking, or acoustic properties are still experienced, corrections can again be made by the addition or removal (and replacement) of adhering profiles. In-flight testing may be continued by iterative measurements, and as needed corrective changes may be made until desired parameters are achieved. In helicopter embodiments, both the main lifting rotor blade and the tail rotor blade can be adjusted by the systems and methods of this invention.

Figure 1B:
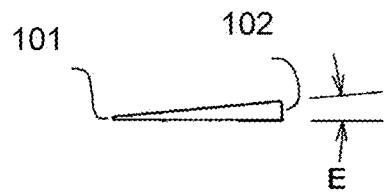
FIG. 1B illustrates a side view of a wedge of the prior art.
Figure 1C:
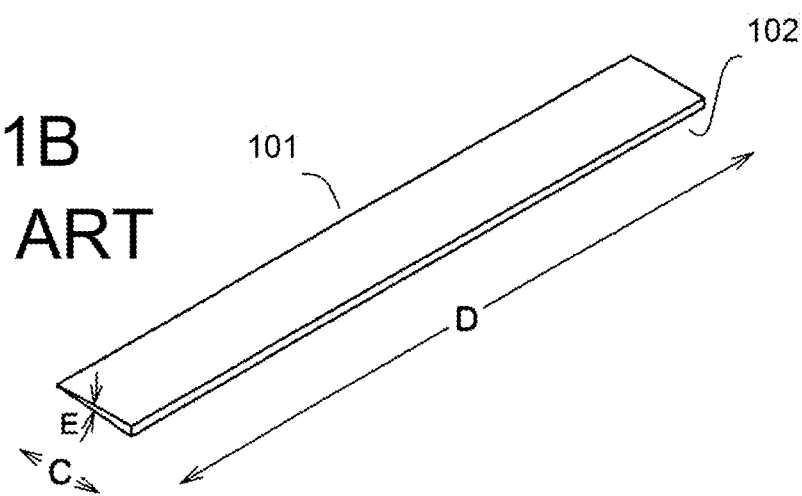
FIG. 1C illustrates a top perspective view of a wedge of the prior art.

As can be seen in the prior art indicated in FIGS. 1A-1C, rotor blade 100 includes a leading edge 101 and a trailing end 102 when viewed from the top. As is common, rotor blade 100 attaches to a rotor head via lugs 104. Rotor blade includes span B from the rotor head to outboard rotor blade tip end 105. Profile shapes 103a and 103b of varied length at different positions along radial extension are shown along trailing edge 102 (along a top surface 122 of rotor blade 100). The blade chord dimension A extends between the leading edge and trailing end. The span dimension B is measured in the direction from the center of the rotor radially outward to the tip of the rotor as shown. Profile has thin leading edge 101, with ramp angle E and elongated wedge chord dimension C Span-wise placement (along with upper or lower side placement) of segment length D of the profile on the surface of the rotor blade will vary depending upon the specific vibration and track corrections needed.

Figure 2:
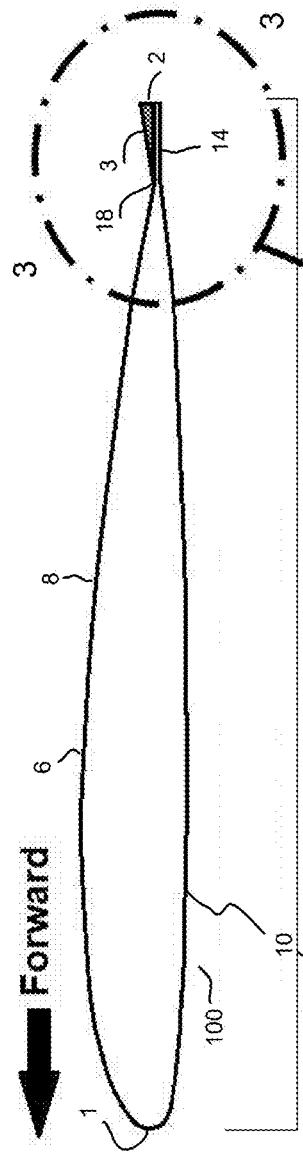
FIG. 2 illustrates a side cross-sectional view of a blade airfoil.

As can be seen in FIG. 2, an embodiment of the present invention is shown in side cross-sectional view of rotor blade 100, including leading edge 1 and trailing end 16 of rotor blade (airfoil) 100 defining chord length 7. Rotor blade 100 includes camber 6 along upper surface 8 with a preferably slightly cambered lower surface 10. Profile 3 is set along trailing edge 2 on upper surface 8. Rotor blade 100 may include trailing tab 14 wherein cambering of upper and lower surface are diminished to provide more horizontally extending trailing tab 14, as is common on certain rotor blades in service. Tab 14 meets camber 6 at camber terminal 18 (an artificial span-wise line or plane drawn between top and bottom of blade at points (lines) where cambering profile is modified in the tracking direction).

Figure 3:
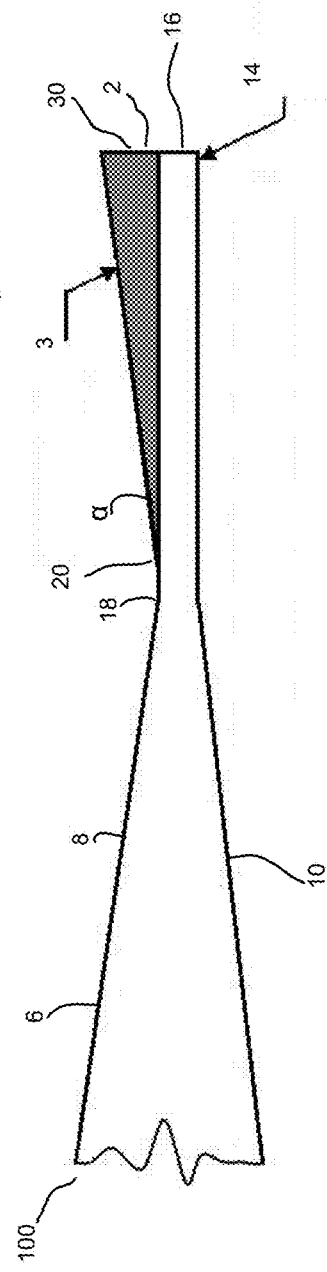
FIG. 3 illustrates a magnified view of circle 3-3 from FIG. 2 showing a side cross-sectional view of the trailing end of a rotor blade.

As shown in FIG. 3, prior art standard wedge profile 3 is shown on upper surface 8 along trailing end 16 of rotor blade 100. Trailing end 16 of blade/tab may correspond with trailing side 30/trailing edge 2 of wedge profile 3 to form a smooth line/plane. Wedge profile 3 creates angle α at leading corner 20. As shown, trailing side 30 may be vertical and/or parallel with trailing edge of tab.

Figure 4:
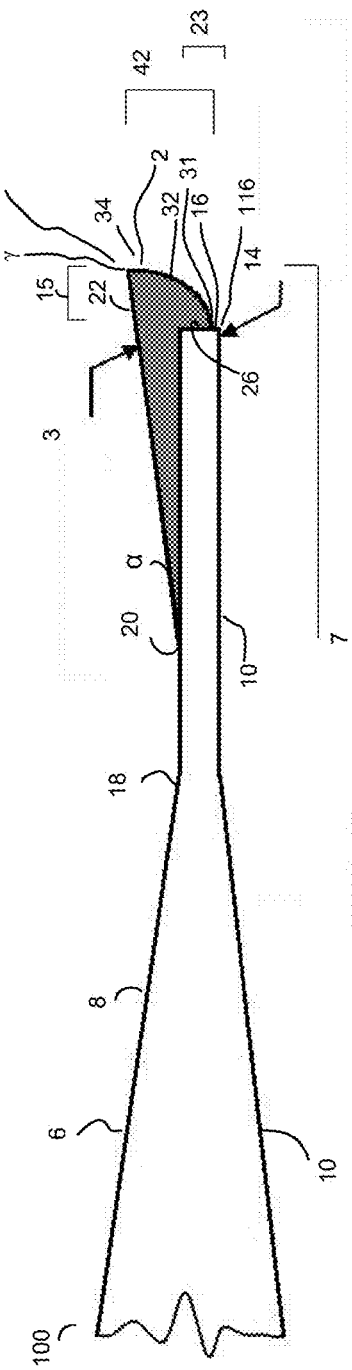
FIG. 4 illustrates a magnified cross-sectional side view of the trailing end of a rotor blade with an alternative wedge embodiment.

As can be seen in FIG. 4, alternative profile geometries may be used in embodiments of the present invention for wedge profile 3 as a quiet wedge. Wedge profile 3 may have leading corner 20 set back, towards trailing end, whereby corner 20 is installed further from camber terminal 18 relative prior art installations, whereby camber 6 of upper surface 8 of blade 100 terminates towards trailing end 16. Alternatively, chord-relative placement remains unchanged from the prior art. Wedge profile 3 may effectively extend chord length 7 by chord extension amount 15, by hanging beyond trailing end 16 of blade 100 to extend the total chord length 7 of rotor blade 100. In the embodiment shown in FIG. 4, radius curvature from top side 22 of wedge 3 extends with perpendicular or acute tangent from arc 34 forming an acute angle γ. Trailing curvature 32 may be structured as a partial arc of a circle or parabola, forming a cylindrical section when considered spanwise in three-dimensions. Wedge profile 3 may include overhang edge 40 with a total wedge height 42 dipping below upper surface 8 of tab 14. Overhang height 42 preferably extends down more than half of the height 23 of the trailing tab 14 trailing end 16. In an alternative embodiment, profile wedge may be installed on the lower surface 10, and/or also may be installed on trailing end 16. Profile 3 may adhere to trailing surface 26 of tab 14.

Figure 10:
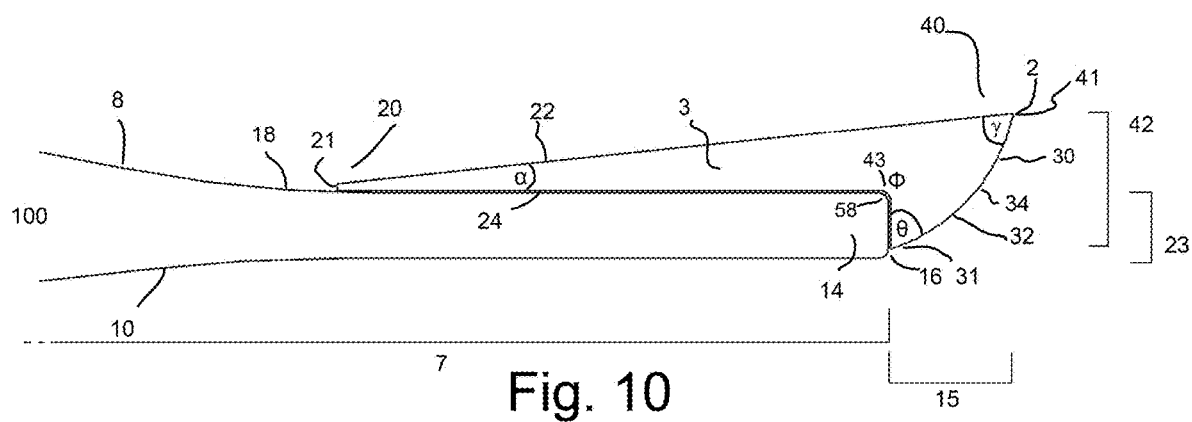
FIG. 10 illustrates a close-up side cross-sectional view of the trailing end of a rotor blade with an alternative embodiment of a wedge applied thereon.

One way to minimize unwanted acoustics is to minimize disruptions of air flowing opposite the wedge installation side, by minimizing disruptions to the camber line. Any airfoil section may be regarded as a thickness distribution plotted around a camber line. The actual blade shape is defined by a pair of camber lines above and below (top and bottom) of airfoil. By positioning the trailing lower corner 31 of profile 3 overhang near the trailing end lower corner 116, the discontinuity of the camber line is smoothed out. Arc 34 causes a smooth taper shape at trailing end of airfoil and extends trailing end aftward. By gradually reducing the thickness of the trailing edge, airflow over the camber affects pitching moment of the airflow, without negatively impacting the camber line of assembly. A precisely arc-shaped wedge profile may be attached to the airfoil's trailing end so that the aft camber is maintained while thinning the trailing edge, so as to preserve pitching moment effectiveness and essentially eliminates audible noise. The features useful in accomplishing the pitching moment effectiveness and reduction in the vortex shedding noise are shown in FIG. 10 as angle theta, and arc length 34 directing and impacting the vortex shedding, and top corner 41 (profile trailing corner) which defines length of overhang edge 40, and top corner 41 as the point at which the trailing curvature 32 begins. When the airfoil is rotating, airflow around the attachable profile routes downstream, to reduce flow separation and/or minimize oscillating vortex formation and shedding noise, compared to airflow generated by the airfoil without the attachable profile. Minimizing the camber line has the effect of reducing sound amplitude, and also shifting the acoustic frequency up, preferably beyond (above) audible range from audible to inaudible.

Figure 5A:
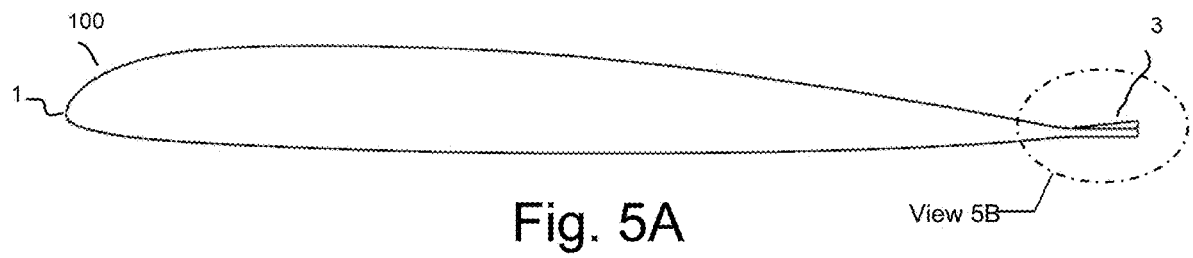
FIG. 5A illustrates a side cross-sectional view of a rotor blade airfoil with an alternative embodiment of a wedge applied thereon.
Figure 5B:
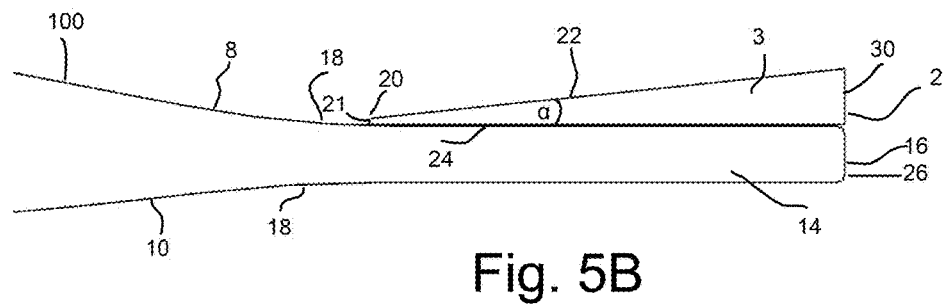
FIG. 5B illustrates a magnified side cross-sectional view of the trailing end of a rotor blade of FIG. 5 at View B with a six-degree wedge.
Figure 6:
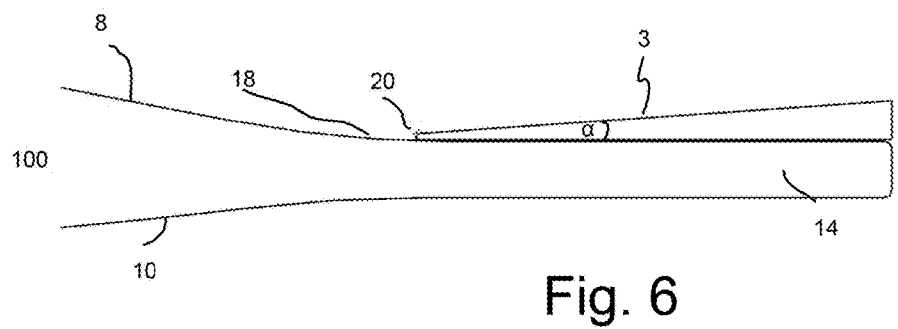
FIG. 6 illustrates a close-up side cross-sectional view of the trailing end of a rotor blade with a four-degree alternative embodiment of a wedge applied thereon.

FIG. 5A illustrates a side cross-sectional view of a rotor blade airfoil 100 with wedge 3 installed. FIG. 5B demonstrates a close-up view of trailing end 16 of rotor 100 in side cross-sectional view magnified as View 5B of FIG. 5A. Prior art type wedge profile 3 shown along upper surface 8 of rotor blade 100, here shown along upper surface 8 of trailing tab 14. Rotor blade upper surface 8 includes cambering with a camber terminal 18 towards the joint with trailing tab 14. Lower surface 10 leads, in trailing direction, towards camber terminal 18. Camber terminal may not align vertically as between upper and lower surfaces 8 and 10, respectively. Wedge profile 3 includes angle α, and includes leading corner 20 forming a leading side 21. Leading side 21 of wedge profile 3 includes a short vertical extension of wedge raising off of upper surface 8. Wedge profile 3 includes top 22 and bottom 24, and is set over tab 14 with bottom 24 mating, preferably adhered, with upper surface 8. Wedge trailing side 30 may align with trailing end 16 of airfoil with trailing surface 26 of tab 14 (or rotor blade 100). Alignment of wedge trailing side 30 with rotor trailing end 16 may be preferred, but is not necessary. In many embodiments, wedge trailing side 30 aligns slightly forward (towards leading edge) of rotor trailing end 16. A similar simple wedge shape is shown having profile with sharper angle α as shown in FIG. 6. Angle α is preferably less than twenty degrees. The reduced angle wedge imparts varied vibrational and tracking properties, along with a slightly improved acoustic profile.

Figure 7:
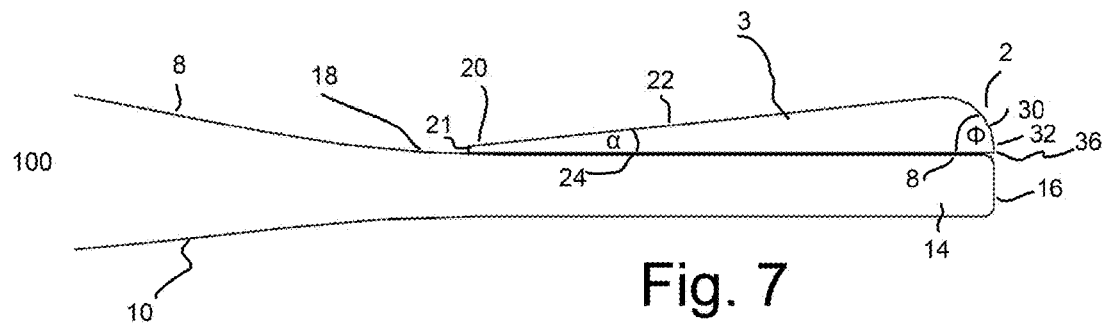
FIG. 7 illustrates a close-up side cross-sectional view of the trailing end of a rotor blade with an alternative embodiment of a wedge applied thereon.

Alternative trailing surfaces of profiles may extend beyond trailing end 16 of rotor blade 100, and thus expand the total width of rotor chord or airfoil. before example, as seen in FIG. 7, angle α, and a wedge with maximum rounded edge radius tail end is shown. Tab 14 of rotor blade 100 includes upper surface 8 with profile 3 applied thereon. Wedge leading side 21 forms an imperfect corner 20 set above or slightly behind (or trailing of) camber terminal 18. Profile 3 includes top side 22 and bottom side 24. Corner 20 forms angle α between upper and lower sides 22 and 24 of profile 3. Bottom side 24 is adhered to upper surface 8 of rotor blade (or tab) via adhesive, as known in the art for field installable (and removable) wedge kits. Profile 3 includes trailing edge 2 with trailing side 30 forming trailing curvature 32 of near a quarter circular arc. Trailing curvature 32 begins (from top corner 41, as seen in embodiments shown in FIGS. 9-11) towards trailing side 30, and curves down to rotor upper surface 8 so that wedge trailing lower corner 31 forms trailing side 30 along rotor blade trailing end 16 (Trailing corner 31 is a feature shown in embodiments having overhang, such as embodiments in FIGS. 8-11). Trailing side 30 of profile 3 forms angle phi Φ of approximately ninety degrees, as shown in FIG. 7. Preferably wedge trailing lower corner Φ is less than ninety degrees. In embodiments shown in FIGS. 8-11, angle phi Φ, of approximately two-hundred seventy degrees, in shoulder is formed with interior corner 43 of profile 3, and is formed around upper corner 58 of trailing tab 14. As seen in FIG. 7, trailing curvature 32 along top side 22 of profile 3 terminates at trailing side 30 with trailing corner 36 situated where wedge bottom side 24 mates with upper surface 8 of rotor blade 100.

Figure 8:
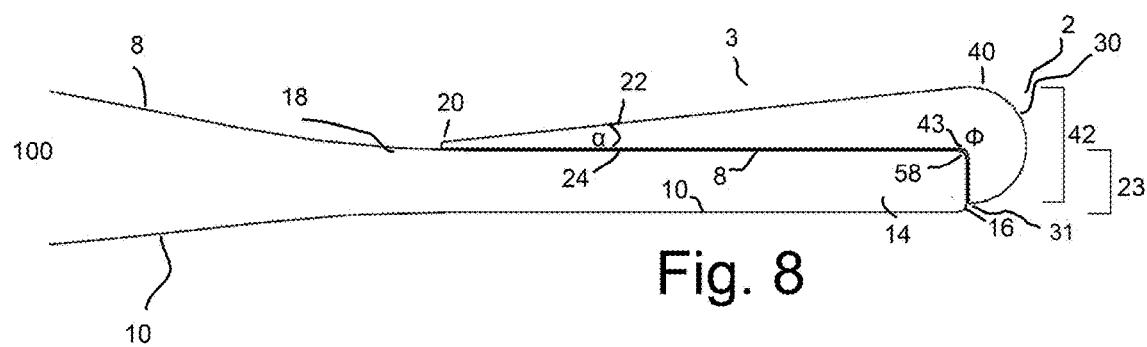
FIG. 8 illustrates a close-up side cross-sectional view of the trailing end of a rotor blade with an alternative embodiment of a wedge applied thereon.

An overhang bullnose wedge embodiment may be applied to rotor 100, as shown in FIG. 8 with half-round rounded tail end. Bottom side 24 of profile 3 mates with upper surface 8 along trailing tab 14, as is known in the art. Angle Φ is set at approximately two hundred-seventy degrees forming a trailing side 30 of profile 3 of approximately one hundred-eighty degrees, or semicircular (forming a semi-cylinder in three dimensions). Overhang edge 40 of profile 3 mates with trailing end 16 of rotor 100, and may be adhered thereto via PSA, or other adhesive known in the art, or may simply set in place reliant solely on adhesive of bottom 24 against blade 100 upper surface 8 or lower surface 10. Similarly, overhang edge 40 of profile 3 may be adhered to trailing end 16 of tab 14. Overhang edge 40 may include overhang height 42 that may extend down along trailing end 16 as much as 100% the height 23 of tab 14, preferably less than 100% height of rotor trailing end 16. Overhang height 42 is preferably less than, but more than halfway down, trailing end 16, and preferably does not extend below opposing surface, lower surface 10. For illustrative purposes, profile is shown primarily on top side of rotor blades, but profile may be alternatively, and or complimentarily attached to lower surface.

Figure 9:
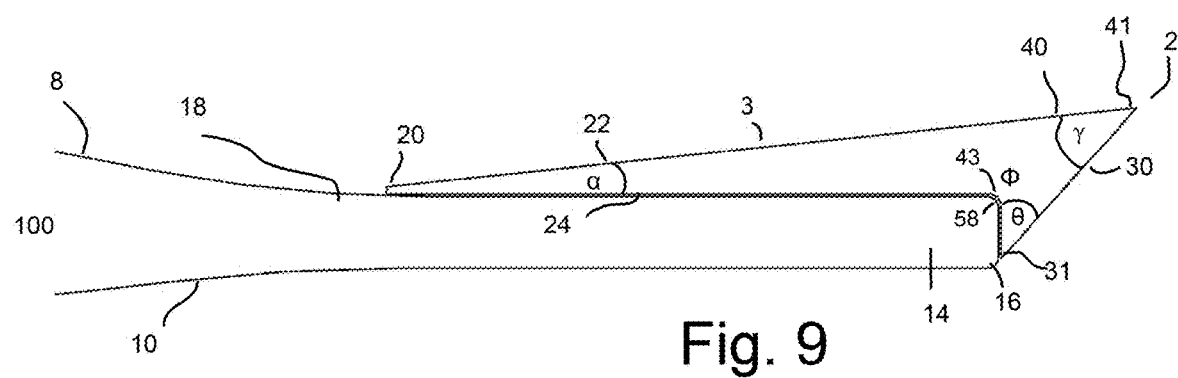
FIG. 9 illustrates a close-up side cross-sectional view of the trailing end of a rotor blade with an alternative embodiment of a wedge applied thereon.

Another aspect of the present invention is the use of the rotor blade or trailing tab trailing end upper corner 58 to index the proper location of profile 3 for attachment. Angle phi is located along interior corner 43. Interior corner 43 preferably matches shape of upper corner 58 forming a shoulder, preferably with an interior angle Φ of approximately two-hundred seventy degrees of interior corner 43 of profile 3, and a complementary ninety-degree corner (somewhat rounded) of the trailing tab upper corner 58. When placing the profile 3 on the airfoil trailing end, the interior corner 43 acts as a self-indexing feature to allow straight and proper location placement of profile 3 relative trailing end of airfoil 100. Without indexing corner, wedge may be misplaced either extending too far aft, or more often angled to overhang more/less in the span-wise direction. The indexing function allows for a proper placement along the span-wise length of profile. FIG. 9 illustrates an extended trailing edge profile 3 with chamfer. As shown in side cross-sectional view Φ is approximately two hundred-seventy degrees. Angle γ is formed by overhang edge 40 at top corner 41 extending to trailing side 30 of wedge. Top side 22 of profile 3 with extended top corner 41 in trailing direction extending chord width, top side 22 forming angle γ with trailing side 30 which, in turn meets with trailing end 16 forming angle θ offset from the vertical trailing end 16, or horizontally offset from trailing end. Angle θ is preferably less than ninety degrees. It is preferred that total internal angles, α plus θ plus γ, is approximately ninety degrees when trailing tab 14 top corner 58, shoulder, includes a right angle. Overhang edge 40 mates with trailing end 16 of airfoil, and may be adhered thereto.

Figure 11:
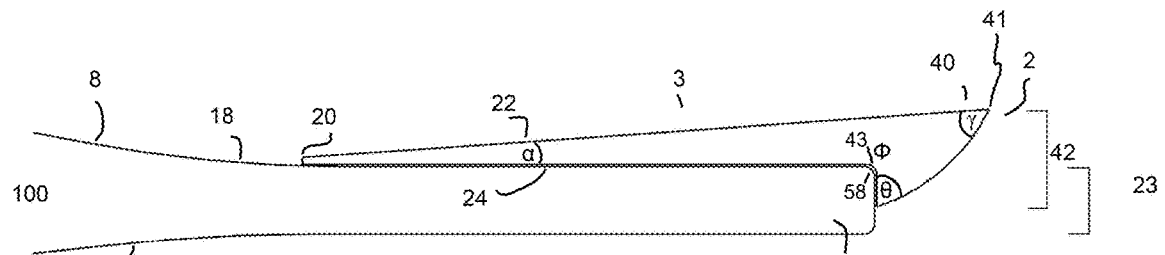
FIG. 11 illustrates a close-up side cross-sectional view of the trailing end of a rotor blade with an alternative embodiment of a wedge applied thereon.

An alternative embodiment of chamfered wedge is shown in FIG. 10 with an extended trailing edge wedge profile 3 extending beyond trailing end 2 of rotor blade 100 with radius blend. Profile 3 includes angles α, θ, Φ, and γ as described above and shown in various illustrative embodiments. Effective chord width 7 is extended via wedge having overhang edge 40 by chord extension 15. Trailing edge height 42 may extend down most, if not all, the height 23 of trailing end 16. Arc length 34 is preferably less than one hundred-eighty degrees. Arc length ends in trailing side corner 31 where trailing curvature 32 meets trailing end 16. Trailing height where trailing corner 31 meets trailing end 16 is shown as just less than the total height 23 of tab. An alternative, as shown in FIG. 11 with reduced angle extended radius blend, shows a similar geometry to the embodiment shown in FIG. 10, with a shorter α. This reduced angle extended trailing edge reduced radius blend wedge design preferably includes sharper angle θ (relative trailing end 16 of trailing tab 14), and angle γ while wedge height 42 of overhang edge 40 extends approximately halfway the height 23 of trailing end 2, preferably less than the height 23 trailing end 2. Trailing height 42 of wedge overhang is shown as approximately half the height of tab. While embodiments have been shown, the larger a embodiment may have trailing edge height of less than full height of tab, preferably closer to half the height of tab, and smaller angle α may include a trailing height to cover the complete (or slightly less) height of tab.

Figure 12A:
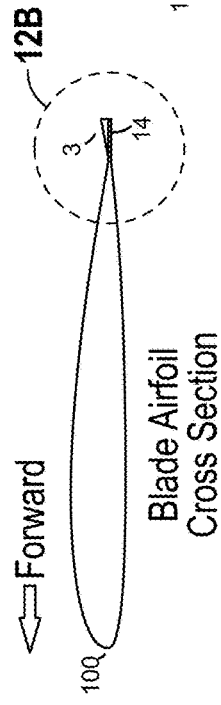
FIG. 12A illustrates a side cross-sectional view of a blade airfoil.
Figure 12B:
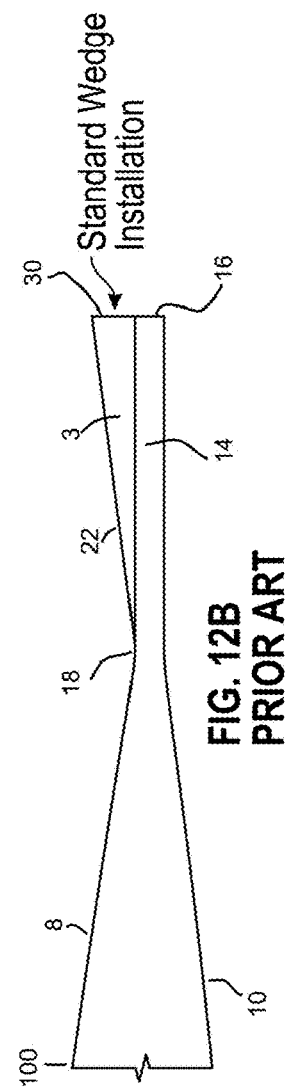
FIG. 12B illustrates a magnified view of the trailing end along circle AA of FIG. 12A.
Figure 12C:
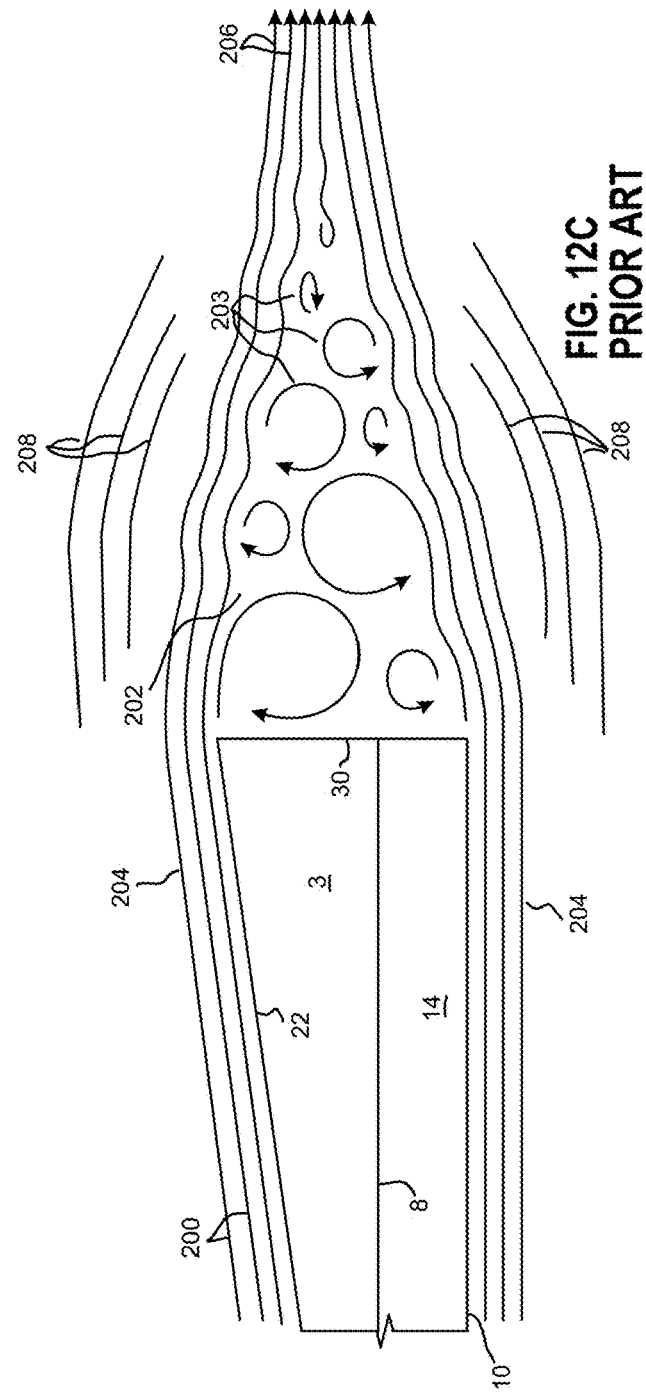
FIG. 12C illustrates a further magnified view of the trailing end of the rotor blade of FIG. 12A including airflow indicators.
Figure 13A:
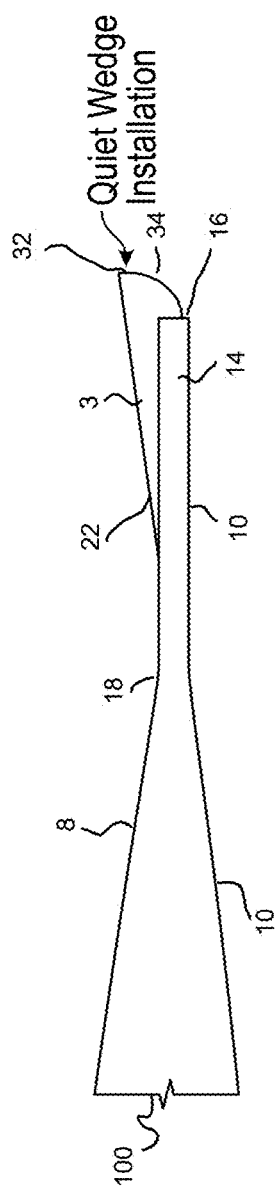
FIG. 13A illustrates a cross-sectional side view of the trailing end of a rotor blade.
Figure 13B:
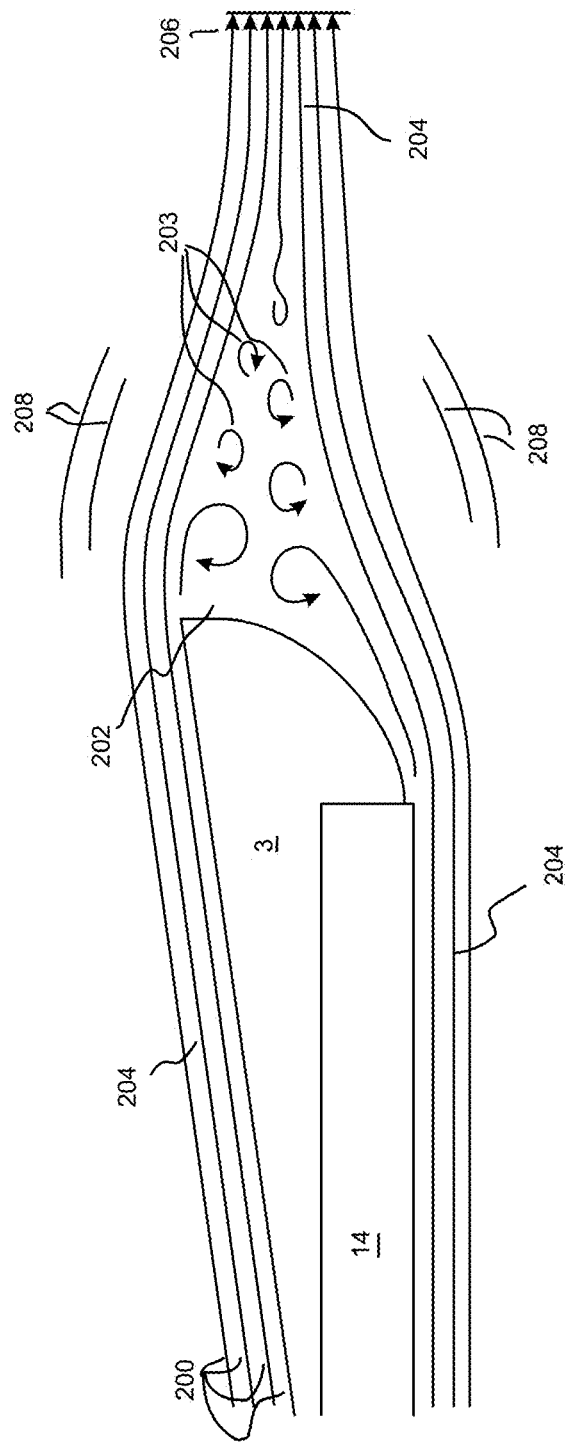
FIG. 13B illustrates a further magnified cross-sectional side view of the trailing end of a rotor blade with alternative wedge applied including airflow indicators.

As shown in FIGS. 12A-C, and 13A and 13B, standard wedge installation (FIG. 12) compares to quiet wedge installation (shown below FIG. 13) for profiles in aerodynamic airflow. As shown in FIG. 12A, side cross-sectional view of rotor blade 100 is shown with profile 3 adhered over tab 14. As seen in magnified end, FIG. 12B, trailing side 30 aligns with trailing end 16 of rotor blade. As can be seen, airflow lines 200 demonstrate the flow of air as rotor blade is engaged and rotated to provide lift to helicopter. Cambering along upper surface of rotor blade causes fast airflow over top side 22 of profile. As airflow 200 extends over top side 22 of profile, resonance zone 202 is shown immediately behind trailing end of wedge and rotor blade with aerodynamic vortices 203. Resonance zone 202 forms a zone which is periodically collapsed by pressure waves forming a loud acoustic noise. It is understood that the size of the resonance zone is related to the volume of acoustic disruption. Minimizing draft resonance stagnant zones has been shown to minimize acoustic disturbance at trailing end of rotor blade. Resonance zone may be determined based on overall blade and wedge configuration and wedge may be shaped to extend in trailing direction (of blade) to encompass to fill such zones. As can be seen in FIGS. 13A and 13B, quiet wedge installation includes profile 3 set along upper surface 8 and trailing end 16 of rotor blade 100 (or tab 14). Trailing curvature 32 forms an arc 34 allowing airflow 204 to speed up along lower surface 10 and trailing curvature 32 to minimize resonance zone 202, and size of vortices 203. Airflow continues in unison past trailing end 206. As shown, the size of vortices 203 is markedly smaller leading to less turbulence and a smaller overall resonance zone 202. Radiation waves 208 are produced above and below wake carry acoustic noise from trailing edge. Notably, the sound radiation waves 208 are reduced with a profile of an embodiment of the present invention shown in FIG. 13B as opposed to the prior art of FIG. 12C.

Figure 14:
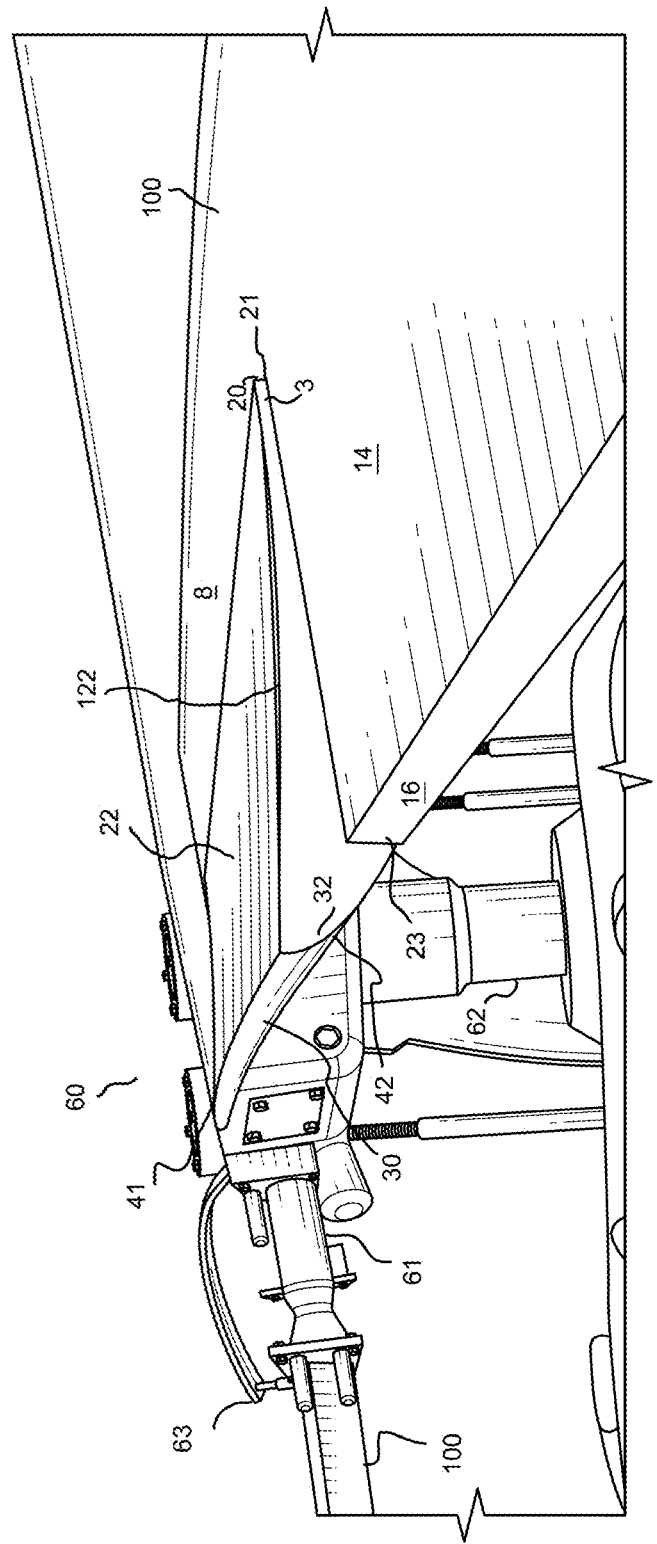
FIG. 14 illustrates a perspective close-up field view of the trailing end of a rotor blade with an embodiment of the present invention attached.

FIG. 14 demonstrates profile 3 set upon rotor blade upper surface 8 and trailing end 16. Rotor head 60 is supported by rotor mast 62. Blades 100 are attached (commonly by lugs) to rotor arms 61 via blade grip 63. On blade 100, leading side 21 of profile 3 sets in the leading-side direction. Profile 3 is set upon trailing tab 14. Profile trailing corner 41 sits slightly above leading corner 20, 0 at trailing corner forming a slightly less than ninety degrees with trailing curvature 32 running down to rotor trailing end 16 with a height 42 extending down less than the height 23 of the trailing end 16.

The presently disclosed subject matter is not limited to any particular helicopter/rotor blade configuration, as the presently disclosed subject matter may be used in a variety of applications. Rotor blade may be used in particular, but should be understood to generally refer to airfoils. Rotor blades are unique in that they rotate with a modified air speed in span-wise direction, but in the cross-section review, should not be understood as differing from airfoil. For rotor blades, in particular, a profile with span-wise modifications in the profile shape are contemplated. Airflow is routed over an outer surface of a tracking wedge and other shown profiles. Movement of the airflow moving over a surface of the profile is modified in a suitable path to reduce noise using an acoustic management shape. Acoustic management shapes may be configured to reduce an amount of disturbance placed on the air moving over the surface of the profile. In some examples, an acoustic management shape comprises less than straight top side dimensions, such as concave or convex shapes of the profile, and/or extending chord width.

While various embodiments of the present invention have been described, the invention may be modified and adapted to various operational methods to those skilled in the art. The term wedge is not meant to be limiting, and refers to blade tracking devices as are commonly referred to as "wedges" in the art, regardless of "wedge-type" shape. Profiles are generally referred to as "wedges" but the shape of the profile(s) is not limited to wedges as are known in the art. Certain angles and geometries of the wedge are provided for illustrative purposes, and should set the general idea of the relative sizes of angle, if not the range of potential angle sizes. Similarly, while only demonstrated on the upper side of the blade/tab, the profiles may be installed under the lower surface of the blade/tab. Therefore, this invention is not limited to the description and figure shown herein, and includes all such embodiments, changes, and modifications that are encompassed by the scope of the claims.

I claim:

1. A method for reducing airframe vibration, improving blade tracking, and reducing undesirable acoustic effects of a helicopter rotor blade, said method comprising the steps of:
    a) selecting a profile shape having a trailing edge trailing curvature set between a trailing side corner and a trailing corner so that a trailing edge of the profile shape modifies the flow pattern at the trailing end of a rotor blade;
    b) applying an attachable profile of the selected profile shape to either an upper or lower surface of the rotor blade so that the attachable profile extends rearward beyond a trailing end of the rotor blade;
    c) routing downstream velocity and vortex shedding of the attachable profile; and
    d) modifying flow characteristics in a separating shear layer to reduce vortex shedding noise and to alter a frequency of flow instabilities from audible to inaudible frequencies.

2. The method as set forth in claim 1 further including the step of adhering the attachable profile to the trailing end of the rotor blade.

3. The method as set forth in claim 1 wherein said step of applying comprises applying the attachable profile to the upper surface of the rotor blade.

4. The method of claim 1 where the attachable profile is permanently attached to the airfoil.

5. The method of claim 1 where the attachable profile is detachably attached to the airfoil for the purpose of future removal.

6. The method as set forth in claim 1 wherein said step of applying comprises applying the attachable profile to the lower surface of the rotor blade.

\* \* \* \* \*